Fig. 1

INVENTOR.
Paul Kollsman
BY
Howard G. Russell
ATTORNEY

Fig. 4

INVENTOR.
Paul Kollsman

United States Patent Office 2,943,989
Patented July 5, 1960

2,943,989
APPARATUS FOR MODIFYING THE CHEMICAL COMPOSITION OF SUBSTANCES BY ION TRANSFER

Paul Kollsman, 100 E. 50th St., New York, N.Y.

Original application July 16, 1957, Ser. No. 672,311. Divided and this application Nov. 7, 1958, Ser. No. 775,670

34 Claims. (Cl. 204—301)

This invention relates to the art of modifying the chemical composition of substances by a transfer of ions under the influence of an electric current in a process commonly called electrodialysis.

This application is a division of my co-pending application Serial No. 672,311, filed July 16, 1957. Application 672,311 is a continuation-in-part application of an earlier application Serial No. 175,126, filed July 21, 1950, allowed September 16, 1957, with 19 apparatus claims, and forfeited subsequent to the filing of said application Serial No. 672,311.

The fundamentals of ion transfer have been known for many years. Briefly, the principle underlying electrodialysis is the fact that compounds in solution, for example, salt in water, split into charged atomic or molecular particles. These charged particles can be forced to move in a controlled fashion under the influence of an impressed electrical potential which may be created between a positively charged anode and a negatively charged cathode. The negatively charged particles tend to travel to the anode and are called anions for this reason and the positively charged particles are attracted by the cathode and are called cations.

Means are also known for selectively influencing, restricting, or impeding the movement of ions which are under the influence of an electric bias. Substances are known which, when formed into a thin wall or membrane, permit anions to pass therethrough while obstructing the passage of cations and other substances are known which permit cations to pass therethrough while blocking the passage of anions. Such membranes have also become known as "permselective" or selectively permeable membranes.

It is thus possible to reduce the salt content of saline solutions by causing ions of the salt to pass from one chamber containing the solution through appropriate ion discriminating membranes or wall portions into other chambers, thus removing from the solution the salt it originally contained.

The present invention provides improvements in, and refinements of, apparatus for electrodialysis, making the apparatus more efficient, resulting in products of higher purity, greater concentration and greater uniformity than it has heretofore been possible to attain, as far as I am aware.

The present invention and improvements render practical for commercial and economic operation certain basic processes and procedures which heretofore were carried out on a laboratory scale and which were not sufficiently practical for economic commercial operation.

The present invention, among numerous other applications, is admirably suited for the treatment and purification of water to convert raw salt water into fresh water for agricultural and industrial uses, and even for human consumption as drinking water.

However, the invention has broader uses and applications and is particularly suited for the production of certain commercially important and relatively expensive chemical compositions from other compositions which are cheaper and more abundantly available. According to the invention these processes are carried out under influence of an electric current, yet without the presence of electrodes in the chambers in which ionization and deionization take place. In this manner certain undesirable reactions are eliminated which would occur at the electrodes if electrodes were physically present in the ionization and deionization chambers.

By way of example, potassium bromide and hydrogen chloride may be produced from potassium chloride and hydrogen bromide in the presence of water. Other uses and applications of the invention will suggest themselves to persons skilled in the art.

The various objects, features and advantages of this invention will appear more fully from the detailed description which follows, accompanied by drawings, showing, for the purpose of illustration, apparatus for practicing the invention.

The invention also consists in certain new and original features of construction and combination of parts, as hereinafter set forth and claimed.

Although the characteristic features of this invention which are believed to be novel will be particularly pointed out in the claims appended hereto, the invention itself, its objects and advantages, and the manner in which it may be carried out will be better understood by referring to the following description taken in connection with the accompanying drawings forming a part of it, in which:

In the following description and in the claims, various details will be identified by specific names for convenience. Like reference characters refer to like parts in the several figures of the drawings.

In the drawings accompanying and forming a part of this specification, certain specific disclosure of the invention is made for the purpose of explanation of broader aspects of the invention, but it is understood that the details may be modified in various respects without departure from the principles of the invention and that the invention may be applied to, and practiced by, other structures than the ones shown.

Figure 1:
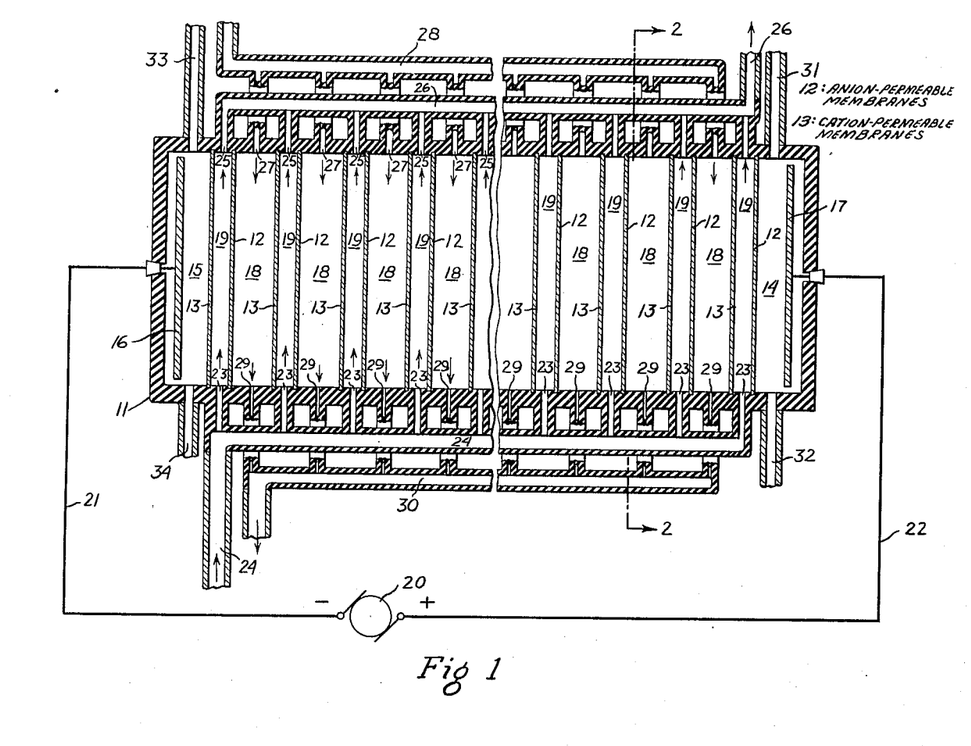
Fig. 1 is a diagrammatic representation, in vertical cross section of an improved apparatus embodying the present invention.

The principles and features of the invention are readily understood by first considering the basic structure of an apparatus for practicing it. Figure 1 is a diagrammatic illustration of an apparatus particularly designed for increasing and decreasing the salinity of water by electrodialysis, but it may be used for the treatment or production of other fluids and compositions.

A tank 11 is subdivided into a plurality of chambers or cells by separating ion discriminating walls or diaphragms composed of a suitable composition or material imparting to the walls or diaphragms ion discriminating characteristics. Thus, certain diaphragms 12 are anion permeable and cation repellent, while other diaphragms 13 have the opposite characteristics of being cation permeable and anion repellent. The diaphragms are arranged in alternating sequence with respect to traverse of the tank from one end to the other so that an anion permeable diaphragm follows a cation permeable diaphragm and is, in turn, followed by an anion permeable diaphragm and so forth.

The chambers or cells may be classified into two terminal cells 14 and 15 containing electrodes 16 and 17, and a plurality of intermediate cells 18 and 19.

The electrode 16 is connected to the negative pole of a source of electric energy 20 by a lead 21 thus becoming a cathode, and the electrode 17 is connected to the positive pole of a source 20 by a lead 22 making the electrode 17 an anode. The intermediate cells 18 may conveniently be termed concentration cells, and the intermediate cells 19 may be called dilution cells, according to the character of the electrodialytic action taking place therein.

The dilution cells 19 are preferably narrower than concentration cells 18, width being measured between the bordering diaphragms.

Speaking first of the dilution cells 19, the cells have inlet ports 23 at, or near, the bottom admitting fluid into the dilution cells from an inlet duct 24 which is suitably manifolded with respect to all the dilution cells.

An outlet port 25 is provided at, or near, the top of each dilution cell and leads to an outlet duct 26.

The concentration cells 18 have a supply port 27 at or near the top manifolded with respect to a supply duct 28, and a restricted discharge port 29 provides for the withdrawal of fluid from a point near the bottom of the concentration cells into a discharge duct 30. The supply duct 28 feeds fluid into which ions are to be transferred.

Separate ducts 31, 32, 33 and 34 are preferably provided for the terminal cells 14 and 15 for the supply of fluid to the terminal chambers and the withdrawal therefrom. The fluid of the terminal chambers is preferably handled separately because of certain electrochemical reactions which may be induced by the physical presence of the electrodes in these chambers, making it generally undesirable to mix the product of the terminal cells with the products of the dilution cells or of the concentration cells.

In certain instances it may even be advisable to provide for separate handling of the fluid leaving the cells immediately adjacent the terminal cells by providing separate outlet and discharge facilities for them.

From the arrangement of the ports and ducts it is evident that the direction of flow through the dilution cells is upwards, or opposed to gravitation, while the direction of flow through the concentration cells is opposed to the flow through the dilution cells and is downward, following gravity.

The supply of fluid through the inlet duct 24 is such that the fluid passes through the dilution cells at a predetermined controlled slow rate which is so maintained as to insure a predetermined degree of dilution, by reason of ion depletion, to take place within the cells.

The supply, and particularly the discharge or withdrawal of fluid from the concentration cells is preferably maintained at a fraction of the total volumetric flow passing through the dilution cells, a preferred range of ratios being that in which the flow through the concentration cells is restricted to between one-half and one-twelfth the volumetric flow passing through the dilution cells. This is preferably accomplished by installation of flow restrictions which may be restricted capillary passages 29, as illustrated.

Since most electrodialytic processes involve a transfer of liquid through the diaphragms, it is convenient to compare the volumetric flows through the dilution and the concentration cells by reference to the volume entering the dilution cells and the volume leaving the concentration cells. Thus the volume of the fluid entering the dilution cells includes that portion of fluid which permeates the diaphragms of the dilution cells, and the volume withdrawn from the concentration cells includes the fluid gain by reason of passage of fluid into the concentration cells through its diaphragms.

The operation of the apparatus may be conveniently explained by a specific example. It may be assumed that the apparatus is being used for the production of desalted water and the simultaneous production of concentrated sea water or brine.

When the operation of the device in connection with water purification is understood, it will easily be seen how other compounds in solution may be treated in the apparatus.

It may be assumed that an electrical potential is applied to the electrodes at the time salt-containing raw water enters through the inlet duct 24. The raw water was preferably filtered to free it from mechanical impurities, and is substantially evenly distributed over the great number of dilution cells 19 through which it slowly flows in the direction opposed to gravity.

Assuming, for reasons of simplicity, that the only salt present in the raw water is sodium chloride, the positively charged sodium cations are attracted by the cathode 16 and tend to travel towards it. The sodium cations pass through the cation permeable diaphragms 13 and accumulate in the concentration cells 18 which they are unable to leave because of the cation-blocking properties of the diaphragms 12 which bar their path.

Similarly, the chlorine anions pass through the anion permeable diaphragms 12 and accumulate in the concentration cells 18 from which their exit is barred by the anion blocking properties of the diaphragms 13.

The sodium and chlorine ions in the concentration cells recombine as sodium chloride and cause the salt concentration in the cells 18 to increase, while simultaneously the salt concentration in the dilution cells 19 decreases.

Since purified water, supplied through duct 28, is present at the top of the concentration cells 18, the purification of water flowing through the dilution cells may be carried to a high degree, and water leaving through the outlet ports 25 has a particularly high degree of purity.

The flow through the concentration cells takes place at a volumetric rate which is only a fraction of the volumetric rate of flow through the dilution cells. For this reason the salt enrichment per volumetric unit of fluid in the concentration cells reaches a higher degree than the salt depletion in the dilution cells. Assuming, for example, that the volumetric flow through the concentration cells is one-sixth of the volumetric flow through the dilution cells, it is evident that the concentration taking place in the concentration compartment is six times as great per volumetric unit of fluid as the loss of salt in the dilution cells so that the water leaving the concentration compartment through the discharge ports contains six times the amount of salt as the sea water entering the dilution cells.

The aforementioned flow and concentration ratios involve several economic advantages. Firstly, it seems that the transfer of fluid, or, in other words, the loss of water by passage from the dilution compartments into the concentration compartments at any particular point of the diaphragm is in approximation inversely proportional to the concentration on the other side of the diaphragm at the point where the loss occurs. Since, furthermore, the loss of fluid appears to be proportional to the transfer of ions, the presence of a higher ion concentration near the bottom of the concentration cells lessens the loss of fluid from the dilution cells in which the greatest loss also tends to occur near the bottom. Thus the high ion concentration in the concentration cells tends to reduce the loss of fluid from the dilution cells.

The high concentration of the fluid leaving the concentration cells makes the fluid suitable for further commercial use, which it might not have, if the concentration were less. Thus the resultant brine may be used for manufacture of dry salt and other uses.

In addition, greater economy is achieved due to the fact that the fluid in the cells 18 offers little resistance to electric current because of the high concentration by reason of the reduced volumetric rate of flow.

It is easily seen that the ion depletion in the dilution cells per inch of advance from the inlet ports 23 to the outlet ports 25 proceeds at a slower linear rate than the ion enrichment per inch of advance from the supply ports 27 to the discharge ports 29.

The volumetric rate of flow through the dilution cells 19 may be controlled either by control of the fluid pressure or by the dimensions of the ports 23, or both, in such a way that the fluid leaving the device through the outlet duct 26 has the desired degree of dilution, and the volumetric flow through the concentration compartment is so controlled as to maintain the ion enrichment at a predetermined ratio with respect to the ion depletion in the adjoining cells. For example, the ratio may be one to six or one to ten, or any other figure, as conditions may require. This is conveniently effected by control of the outflow, for example, by installation of suitably restricted discharge ports 29.

A particular feature of the counterflow arrangement of the illustrated apparatus is its favorable effect on the current density and distribution. It is evidently desirable to have the greatest current density near the bottom of the cells in order to remove the greatest possible number of ions per unit of time from the flow entering the dilution cells. A high current density near the bottom of the cells is promoted by the concentration cells in which the greatest concentration and hence the greatest conductivity is likewise near the bottom, and not near the top as it would be in an installation which does not employ the principle of opposite flow on opposite sides of the diaphragms.

Fluid may enter and leave the terminal compartments in any desired direction. The ducts 31 to 33 may be inflow ducts and the ducts 32 and 34 may be discharge ducts, in which event the flow through the terminal cells would also be opposed to the direction of flow in the dilution cells adjoining them. Nevertheless, the flow through the terminal cells may be reversed, if this should be desirable.

Figures 2, 3:
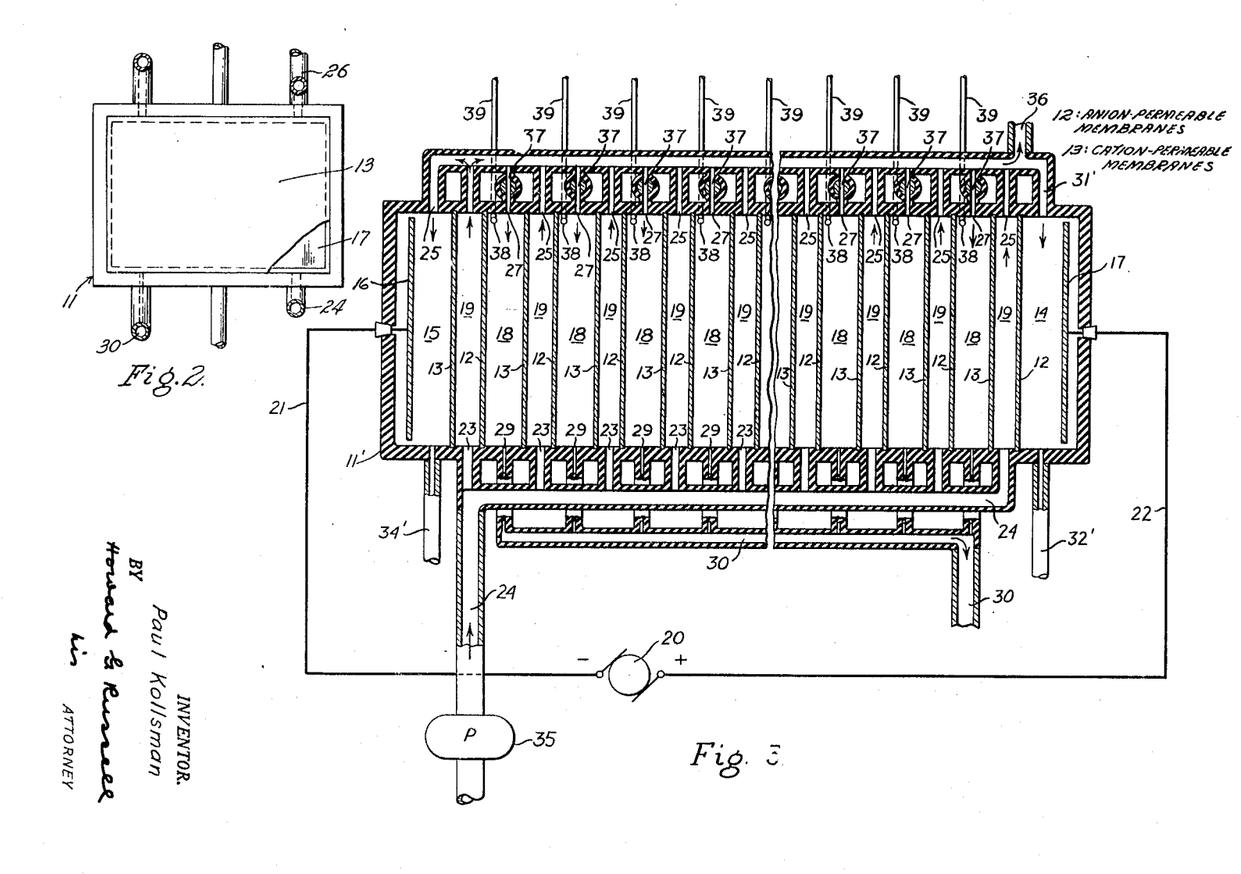
Fig. 2 is an elevational view taken on line 2—2 of Fig. 1.
Fig. 3 is a diagrammatic representation of a modified form of apparatus.

A modified form of apparatus is shown in Figure 3. The tank 11' with its cells, diaphragms, and electrodes corresponds to the apparatus shown in Figure 1 and corresponding reference numerals are applied to corresponding parts. A pump 35 is shown in the inlet duct 24 for feeding fluid into the dilution cells 19 through inlet ports 23.

Concentrate leaves the concentration cells 18 through reduced discharge ports 29 at a controlled reduced rate, and the discharge duct 30 is manifolded with respect to the discharge ports 29.

Ion depleted fluid leaves the dilution cells 19 through outlet ports 25 and flows into an outlet duct 36 to which the supply ports 27 of the concentration cells are also manifolded. Valves 37 may be provided in the passage between the outer duct 36 and the concentration cells 18. Provision may be made to prevent accumulation of gas in the cells. This is indicated by vent ports 38 leading to vent ducts 39. In the position in which the valves are shown fluid enters the concentration cells 18 from the outlet duct 36. In the treatment of water this will be purified water, the product of the dilution cells 19. The volumetric flow diverted from the output of the dilution cells 19 for use in the concentration cells is small, and is only a fraction of the volume of purified water produced, the volume being controlled by the restricted flow of concentrate through the restricted discharge ports 29 into the discharge duct 30. The supply of deionized fluid into the concentration cells may be reduced or entirely interrupted by closing the valves 37, so that thereafter the flow of concentrate leaving the concentration cell is equal to the passage of fluid through the membranes, the withdrawn concentrate being replenished solely by the fluid passing through the diaphragms incidental to the ion exchange.

The terminal cells 14 and 15 may also be supplied with fluid from the outlet duct 36 or, if required, from any other source. In the illustrated form of apparatus ducts 31' and 33' connect the terminal chambers with the outlet duct 36 and the discharge from the terminal chambers takes place through the ducts 32' and 34'.

It will be noted that, aside from the transfer of ions through the diaphragms, no electrochemical reaction takes place in any of the intermediate cells, since the cells do not contain electrodes.

Considering now the changes taking place in the terminal cells 14 and 15, it is apparent that in the treatment of sea water, sodium ions migrate through the diaphragms 13 thereby depleting the cell 15 of sodium ions. There remains an unbalanced surplus of chlorine in the cell which may be discharged from the chamber, either as a gas or in solution through the separate ducts 32 or 32', 34 or 34', respectively (Figures 1 and 3), or through the duct 33 (Figure 1) if the direction of flow is reversed.

Similarly, chlorine anions migrate from the terminal cell 14 through the diaphragm 12 and leave an unbalanced sodium surplus in the cell which causes formation of sodium hydroxide and hydrogen, unless other reactions are caused to take place by addition of other chemicals to the fluid entering the chamber 14.

The electrodes 16 and 17 are made of material resisting decomposition. For the treatment of water, carbon, or graphite may be used as a material for the anode and iron or nickel-chromium may serve as the cathode.

Since the dilution cells represent a greater ohmic resistance per unit of width than the concentration cells because of the lower average concentration of the fluid, dilution cells may be made narrower than the concentration cells.

In actual practice the thickness of the fluid films in the cells is considerably less than shown in the drawings in which many dimensions are exaggerated for the sake of clearness. It has been found particularly advantageous to make the spaces between the diaphragms less than the thickness of the diaphragms, if highly conductive diaphragms are employed. For example, a spacing of 1 and 2 millimeters has been found advantageous for diaphragms of 3 millimeter thickness.

In the practice of the invention flows of fluid to be deionized are confined between flows of fluid into which ions are to be transferred through ion-discriminating diaphragms. The fluids are maintained in the state of flux in opposite directions past the diaphragms and the volumetric flow of the fluid into which ions are to be transferred is maintained smaller than the volumetric flow of the fluid to be deionized. By this arrangement the concentration on both sides of the diaphragm is greatest near the bottom of the cells and the fluid transfer through the diaphragms is minimized as hereinbefore set forth.

Figure 4:
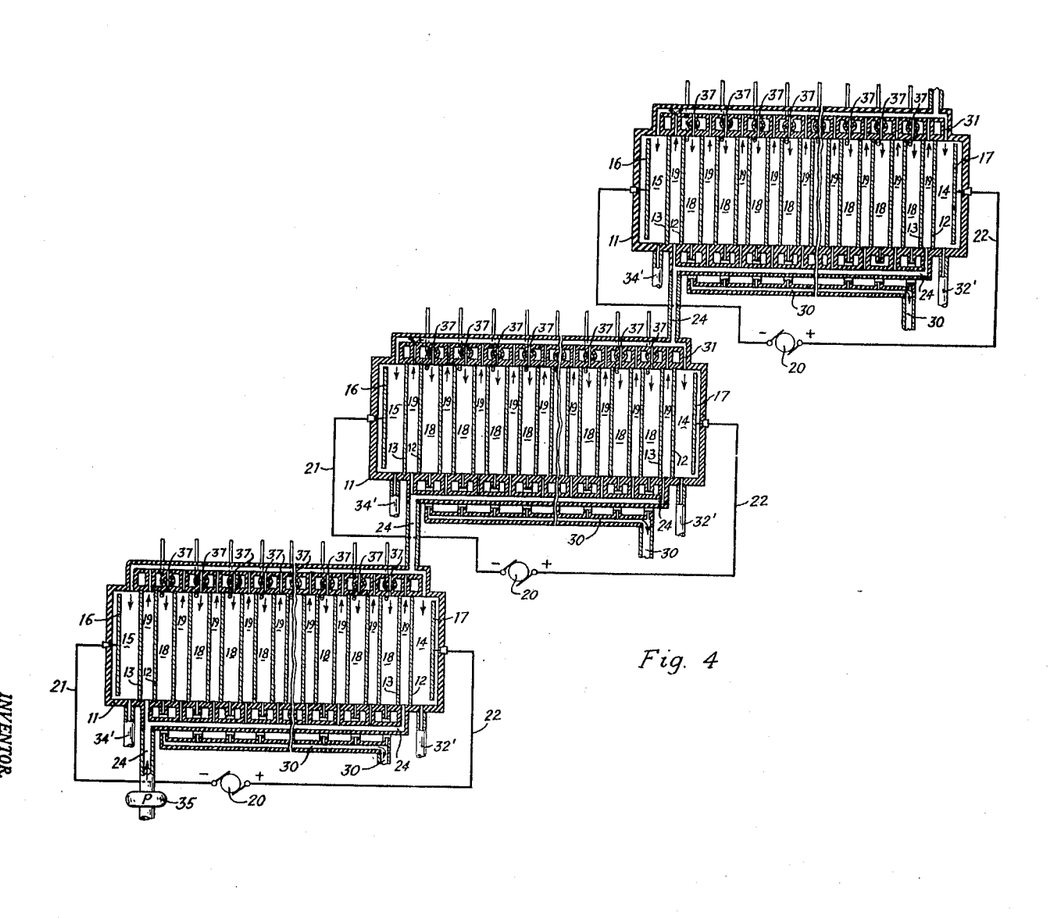
Fig. 4 diagrammatically illustrates the treatment of fluids in steps or stages.

The volume of fluid withdrawn from the concentration cells may be supplied in part from the output of the dilution cells, but may be replenished entirely by fluid transfer through the diaphragms. It is evident that in the treatment of fluids in steps or stages as illustrated in Fig. 4 by passage, in succession, through several ion exchange units as represented by Figures 1 and 3, the fluid supplied to the concentration cells in the first stage or unit need not be as highly purified as in the succeeding stages, since the purity of the fluid at the top of the concentration cells need not be greater than the desired purity of the fluid leaving the dilution cells.

Referring to the illustrated forms of apparatus, it is seen that the flow of fluid to be deionized is split into a plurality of substantially equal branches, all of which are subjected to the same current. It follows that the rate of deionization per inch of flow is the same in all the branches, assuming that the flows are equal. This is conveniently controlled by proper adjustment of the individual ports through which the fluid enters or leaves the cells.

Evidently the invention may be applied to, and practiced by, various forms of apparatus and is not limited to the specific devices illustrated in the drawings.

Thus numerous changes, additions, omissions, substitutions and modifications in the apparatus, as well as other applications of the apparatus may be made without departing from the spirit, the teaching, and the principles of the invention.

For the sake of brevity the term "ion discriminating diaphragm" is used in the claims to identify membranes which have the inherent property of being permeable to ions of one sign and passage resistant to ions of the opposite sign, and membranes which have the opposite characteristic of being passage resistant to ions of one sign and permeable to ions of the opposite sign.

What is claimed is:

1. An apparatus for increasing and decreasing the ion content of liquids comprising, means forming a plurality of chambers, not less than five, the chambers being arranged in line; anion-discriminating and cation-discriminating diaphragms between said chambers for establishing a selective path for ions from one chamber into an adjoining chamber under the influence of an electrical potential, said diaphragms being arranged in alternating sequence with respect to traverse from one terminal chamber through the intermediate chambers to the other terminal chamber; an electrode in each of the terminal chambers, one electrode to serve as an anode, the other electrode to serve as a cathode; means including inlet ports at the bottom of certain alternate chambers for supplying raw liquid to be deionized into said alternate chambers; means including outlet ports at the top of said alternate chambers for discharging treated liquid from said alternate chambers; means including discharge ports at the bottom of other chambers lying between said alternate chambers for discharging concentrate from said other chambers; and means including supply ports at the top of said other chambers for feeding liquid into said other chambers.

2. An apparatus for increasing and decreasing the ion content of liquids comprising, means forming a plurality of chambers, not less than five, the chambers being arranged in line; anion-discriminating and cation-discriminating diaphragms between said chambers for establishing a selective path for ions from one chamber into an adjoining chamber under the influence of an electrical potential, said diaphragms being arranged in alternating sequence with respect to traverse from one terminal chamber through the intermediate chambers to the other terminal chamber; an electrode in each of the terminal chambers, one electrode to serve as an anode, the other electrode to serve as a cathode; means including an inlet duct and inlet ports at one end of certain alternate chambers, said inlet ports being manifolded with respect to said inlet duct, for supplying raw liquid to be deionized into said alternate chambers; means including an outlet duct and outlet ports at the other end of said alternate chambers, said outlet ports being manifolded with respect to said outlet duct for discharging treated liquid from said alternate chambers; and means including a discharge duct and discharge ports at the one end of other chambers which lie between said alternate chambers, said discharge ports being manifolded with respect to said discharge duct, for discharging concentrate from said other chambers.

3. An apparatus for increasing and decreasing the ion content of liquids comprising, means forming a plurality of chambers, not less than five, the chambers being arranged in line; anion-discriminating and cation-discriminating diaphragms between said chambers for establishing a selective path for ions from one chamber into an adjoining chamber under the influence of an electrical potential, said diaphragms being arranged in alternating sequence with respect to traverse from one terminal chamber through the intermediate chambers to the other terminal chamber; an electrode in each of the terminal chambers, one electrode serving as an anode, the other electrode serving as a cathode; means including inlet ports at the bottom of certain alternate chambers for supplying raw liquid to be deionized into said alternate chambers; means including outlet ports in said alternate chambers above the level of said inlet ports for discharging treated liquid from said alternate chambers; means including discharge ports at the bottom of other chambers lying between said alternate chambers for discharging concentrate from said other chambers; means including supply ports in said other chambers above the level of said discharge ports for feeding liquid into said other chambers; and flow restricting means for restricting the passage of liquid passing through said discharge ports to less than the passage of liquid flowing through said inlet ports, the spacing between the respective ports in each chamber being sufficiently great in the direction of the membranes to produce countercurrent flow on opposite sides of the membranes.

4. An apparatus for increasing and decreasing the ion content of liquids comprising, means forming a plurality of chambers, not less than five, the chambers being arranged in line; anion-discriminating and cation-discriminating diaphragms between said chambers for establishing a selective path for ions from one chamber into an adjoining chamber under the influence of an electrical potential, said diaphragms being arranged in alternating sequence with respect to traverse from one terminal chamber through the intermediate chambers to the other terminal chamber; an electrode in each of the terminal chambers, one electrode serving as an anode, the other electrode serving as a cathode; means for passing a flow of raw liquid to be deionized through certain alternate chambers; means for passing a flow of liquid whose ion content is to be increased through certain other chambers lying between said alternate chambers, the flow through said other chambers being substantially opposed to the flow through said alternate chambers and substantially lengthwise of said membranes, including means for restricting the total volumetric flow leaving said other chambers to less than the total volumetric flow entering said alternate chambers.

5. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign, the alternating arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; means for continuously supplying raw liquid to said certain spaces; means for continuously withdrawing deionized liquid from said certain spaces; means for continuously supplying to said other spaces liquid of a lower ionic concentration than said raw liquid; and means for continuously withdrawing liquid from said other spaces, said supplying and said withdrawing means being so arranged as to cause the flow in adjoining spaces to be substantially countercurrent in a direction substantially lengthwise of the membranes.

6. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign and passage resistant to ions of the one sign, the alternatingly arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; means for continuously supplying liquid to said spaces; and means for continuously withdrawing liquid from said spaces, said supplying and said withdrawing means being so arranged as to cause the flow in adjoining spaces to be substantially countercurrent in a direction substantially lengthwise of the membrane.

7. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign and passage resistant to ions of the one sign, the alternating arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; and duct means for continuously supplying liquid to and withdrawing liquid from opposite ends of said spaces, the arrangement being such that liquid supply ducts alternate with liquid withdrawal ducts at one end of alternate liquid spaces, so that the direction of liquid flow past opposite sides of the membrane walls is opposite.

8. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign, the alternating arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; and means for continuously supplying liquid to and withdrawing liquid from said spaces, including inlet ports and discharge ports in said spaces, the inlet ports being at one end of said certain spaces and the discharge ports being at the other end of said certain spaces, and the discharge ports of said other spaces being at the one end of said other spaces adjacent the inlet ports of said one spaces, whereby counterflow is produced in adjoining chambers.

9. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign, the alternating arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; and means for supplying liquid to and withdrawing liquid from said spaces, including inlet ports and discharge ports in said spaces, the inlet ports of said certain spaces being near one end of said certain spaces and manifolded with respect to a first main supply duct, the discharge ports of said certain spaces being near the other end of said certain spaces and manifolded with respect to a first main discharge duct, the discharge ports of said other spaces being near the one end of said other spaces and manifolded with respect to a second main discharge duct, and the supply ports of said other spaces being near the other end of said other spaces and manifolded to a second main supply duct.

10. An apparatus as claimed in the preceding claim 9 in which separate ducts are provided for liquid withdrawn from the electrode-containing spaces.

11. An apparatus for increasing and decreasing the ion content of liquids by ion transfer from one liquid into another liquid, the apparatus comprising, two spaced electrodes, selectively ion permeable membrane walls between said electrodes, said membrane walls being of two types, alternatingly arranged, one type being permeable to ions of one sign and passage resistant to ions of the opposite sign, the other type being permeable to said ions of the opposite sign and passage resistant to ions of the one sign, the alternating arrangement of the membrane walls resulting in the formation of liquid spaces in excess of three, certain spaces being depleted of ions in the operation of the apparatus, other spaces being ion-enriched, said certain spaces and said other spaces alternating with regard to the flow of current from one electrode to the other; means for continuously supplying liquid to said spaces; and means for continuously withdrawing liquid from said spaces, said supplying and said withdrawing means being so arranged as to cause the flow on opposite sides of the membranes to be substantially countercurrent in a direction substantially lengthwise of the membranes.

12. Apparatus for continuously treating liquids comprising, two spaced electrodes, selectively ion permeable membranes between said electrodes, said membranes being of two types alternatingly arranged, one type being permeable to anions and passage resistant to cations, the other type being permeable to cations and passage resistant to anions, said alternating arrangement of membranes resulting in the formation of at least four liquid spaces, means for continuously supplying liquid to each of said spaces, means for continuously removing liquid from each of said spaces, said supplying and withdrawing means being arranged to cause the flow of liquid in adjoining spaces to be countercurrent in a direction parallel to the membranes.

13. Apparatus for continuously treating liquids by transferring under the influence of a direct electric current ions from a first liquid to be deionized into a second liquid to be ionically concentrated, said apparatus comprising, spaced electrodes; a plurality of spaced membranes of two types arranged in alternating sequence between said electrodes, the membranes of one type being selectively permeable to ions of one polarity and passage resistant to ions of the opposite polarity, the membranes of the other type being permeable to ions of said opposite polarity, said alternating arrangement of membranes resulting in the formation of concentrating and deionizing chambers arranged in alternating sequence; means forming liquid inlets into the respective chambers; and means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes.

14. Apparatus for continuously treating liquids by transferring under the influence of a direct electric current ions from a first liquid to be deionized into a second liquid to be ionically concentrated, said apparatus comprising, spaced electrodes; a plurality of spaced permselective anion membranes and cation membranes arranged in alternating sequence between said electrodes, said alternating arrangement of the membranes resulting in the formation of concentrating and deionizing chambers arranged in alternating sequence; means forming liquid inlets into the respective chambers; and means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes.

15. Apparatus for continuously treating liquids by transferring under the influence of a direct electric current ions from a first liquid to be deionized into a second liquid to be ionically concentrated, said apparatus comprising, spaced electrodes; a plurality of spaced membranes of two types arranged in alternating sequence between said electrodes, the membranes of one type being selectively permeable to ions of one polarity and passage resistant to ions of the opposite polarity, the membranes of the other type being permeable to ions of said opposite polarity, said alternating arrangement of membranes resulting in the formation of concentrating and deionizing chambers arranged in alternating sequence; means forming liquid inlets into the respective chambers; means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes; and means for directing the inflow means of at least certain concentrating chambers effluent from the outlet means of at least one of the deionizing chambers.

16. Apparatus for continuously treating liquids by transferring under the influence of a direct electric current ions from a first liquid to be deionized into a second liquid to be ionically concentrated, said apparatus comprising, spaced electrodes; a plurality of spaced membranes of two types arranged in alternating sequence between said electrodes, the membranes of one type being selectively permeable to ions of one polarity and passage resistant to ions of the opposite polarity, the membranes of the other type being permeable to ions of said opposite polarity, said alternating arrangement of membranes resulting in the formation of concentrating and deionizing chambers arranged in alternating sequence; means forming liquid inlets into the respective chambers; means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes; and means for directing effluent from said deionization passage to the inlet of at least certain of said concentration passages.

17. Apparatus for continuously treating liquids by transferring under the influence of a direct electric current ions from a first liquid to be deionized into a second liquid to be ionically concentrated, said apparatus comprising, spaced electrodes; a plurality of spaced permselective anion membranes and cation membranes arranged in alternating sequence between said electrodes, said alternating arrangement of the membranes resulting in the formation of concentrating and deionizing chambers arranged in alternating sequence; means forming liquid inlets into the respective chambers; means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes; and means for directing to the inflow means of at least certain of the concentrating chambers effluent from the outlet means of at least one of the deionizing chambers.

18. Apparatus for continuously treating liquids by transferring under the influence of a direct electric current ions from a first liquid to be deionized into a second liquid to be ionically concentrated, said apparatus comprising, spaced electrodes; a plurality of spaced permselective anion membranes and cation membranes arranged in alternating sequence between said electrodes, said alternating arrangement of the membranes resulting in the formation of concentrating and deionizing chambers arranged in alternating sequence; means forming liquid inlets into the respective chambers; means forming liquid outlets from the respective chambers, said inlet means, chambers, and outlet means providing two distinct liquid passages through the apparatus, a deionization passage and a concentration passage, said inlet means defining an upstream portion of the respective liquid passage, and said outlet means defining a downstream portion of the respective liquid passage, the inlet into the deionization passage being located alongside the adjacent downstream portion of the concentration passage of the apparatus and being separated from last named downstream portion by certain of said membranes, and the downstream portion of said dilution passage being located alongside the adjacent upstream portion of the concentration passage of the apparatus and separated from said last named upstream portion by membranes; and means for directing effluent from said deionization passage to the inlet of said concentration passage.

19. Apparatus for continuously treating liquids by transferring under the influence of a direct electric current ions from a first liquid to be deionized into a second liquid to be ionically concentrated, said apparatus comprising, spaced electrodes; a plurality of spaced membranes of two types arranged in alternating sequence between said electrodes, the membranes of one type being selectively permeable to ions of one polarity and passage resitant to ions of the opposite polarity, the membranes of the other type being permeable to ions of said opposite polarity, said alternating arrangement of membranes resulting in the formation of concentrating and deionizing chambers arranged in alternating sequence; conduit means for introducing liquid to be deionized into said deionizing chambers; conduit means for withdrawing liquid from said deionizing chambers after passage therethrough; conduit means for passing liquid withdrawn from said deionizing chambers into concentrating chambers; and conduit means for withdrawing liquid from said concentrating chambers after passing therethrough.

20. Apparatus for treating liquid by transferring under the influence of a direct electric current ions from a first volume of liquid to be deionized into a second volume of liquid to be ionically concentrated, said apparatus comprising a plurality of concentrating and diluting units, each unit comprising, spaced electrodes, a plurality of spaced membranes of two types arranged in alternating sequence between said electrodes, the membranes of one type being selectively permeable to ions of one polarity and passage resistant to ions of the opposite polarity, the membranes of the other type being permeable to ions of the opposite polarity, said alternating arrangement of membranes resulting in the formation of concentrating chambers and deionizing chambers in alternating sequence in each unit; conduit means for introducing liquid to be deionized into the deionizing chambers of a certain unit; conduit means for passing liquid withdrawn from the deionizing chambers of said certain unit after passage therethrough into the deionizing chambers of the next unit; conduit means for withdrawing deionized liquid from the deionizing chambers of said next unit; conduit means for introducing into the concentrating chambers of said certain unit liquid withdrawn from the deionizing chambers of said certain unit; conduit means for introducing into the concentrating chambers of the said next unit liquid withdrawn from the deionizing chambers of the said next unit; and means for withdrawing liquid from the concentrating chambers of said units after passage therethrough.

21. Apparatus for treating liquid by transferring under the influence of a direct electric current ions from a first volume of liquid to be deionized into a second volume of liquid to be ionically concentrated, said apparatus comprising a plurality of concentrating and diluting units, each unit comprising, spaced electrodes, a plurality of spaced membranes of two types arranged in alternating sequence between said electrodes, the membranes of one type being selectively permeable to ions of one polarity and passage resistant to ions of the opposite polarity, the membranes of the other type being permeable to ions of the opposite polarity, said alternating arrangement of membranes resulting in the formation of concentrating chambers and deionizing chambers in alternating sequence in each unit; conduit means for introducing liquid to be deionized into the deionizing chambers of a certain unit; conduit means for passing liquid withdrawn from the deionizing chambers of said certain unit after passage therethrough into the deionizing chambers of the next unit; conduit means for withdrawing deionized liquid from the deionizing chambers of said next unit; conduit means for introducing into the concentrating chambers of said certain unit liquid withdrawn from the deionizing chambers of said certain unit, said last named conduit means being so arranged as to cause the flow in adjoining chambers to be substantially countercurrent in a direction substantially lengthwise of the membranes; conduit means for introducing into the concentrating chambers of the next unit liquid withdrawn from the deionizing chambers of the next unit, said last named conduit means being so arranged as to cause the flow in adjoining chambers to be substantially countercurrent in a direction substantially lengthwise of the membranes; and means for withdrawing liquid from the concentrating chambers of said units after passage therethrough.

22. Apparatus for treating liquid by transferring under the influence of a direct electric current ions from a first volume of liquid to be deionized into a second volume of liquid to be ionically concentrated, said apparatus comprising a plurality of concentrating and diluting units, each unit comprising, spaced electrodes, a plurality of spaced membranes of two types arranged in alternating sequence between said electrodes, the membranes of one type being selectively permeable to ions of one polarity and passage resistant to ions of the opposite polarity, the membranes of the other type being permeable to ions of the opposite polarity, said alternating arrangement of membranes resulting in the formation of concentrating chambers and deionizing chambers in alternating sequence in each unit; conduit means for introducing liquid to be deionized into the deionizing chambers of a certain unit; conduit means for passing liquid withdrawn from the deionizing chambers of said certain unit after passage therethrough into the deionizing chambers of the next unit; conduit means for withdrawing deionized liquid from the deionizing chambers of said next unit; conduit means for introducing into the concentrating chambers of at least one of said units liquid withdrawn from the deionizing chambers of the same unit; and means for withdrawing liquid from the concentrating chambers of said units after passage therethrough.

23. Apparatus for treating liquid by transferring under the influence of a direct electric current ions from a first volume of liquid to be deionized into a second volume of liquid to be ionically concentrated, said apparatus comprising a plurality of concentrating and diluting units, each unit comprising, spaced electrodes, a plurality of spaced membranes of two types arranged in alternating sequence between said electrodes, the membranes of one type being selectively permeable to ions of one polarity and passage resistant to ions of the opposite polarity, the membranes of the other type being permeable to ions of the opposite polarity, said alternating arrangement of membranes resulting in the formation of concentrating chambers and deionizing chambers in alternating sequence in each unit; conduit means for introducing liquid to be deionized into the deionizing chambers of a certain unit; conduit means for passing liquid withdrawn from the deionizing chambers of said certain unit after passage therethrough into the deionizing chambers of the next unit; conduit means for withdrawing deionized liquid from the deionizing chambers of said next unit; conduit means for introducing into the concentrating chambers of said next unit liquid withdrawn from the deionizing chambers of said next unit; conduit means for introducing electrolyte liquid into the concentrating chambers of said certain unit; and means for withdrawing liquid from the concentrating chambers of said certain unit after passage therethrough.

24. Apparatus for separating a raw solution containing dissolved electrolyte into concentrated and dilute fractions, the apparatus comprising a plurality of concentrating and diluting units each unit comprising spaced electrodes, alternate anion permeable and cation permeable membranes dividing the space between said membrances into alternate concentrating chambers and deionizing chambers, conduit means for passing a stream of raw solution first through the deionizing chambers of one unit and then through the deionizing chambers of a subsequent unit; and conduit means for introducing at least partially deionized solution into the concentrating chambers of said subsequent unit.

25. Apparatus for separating a solution containing dissolved electrolyte into concentrated and dilute fractions, the apparatus comprising a plurality of concentrating and diluting units each unit comprising spaced electrodes, alternate anion permeable and cation permeable membranes dividing the space between said membranes into alternate concentrating chambers and deionizing chambers, conduit means for passing a first stream of solution through the deionizing chambers first of one unit and then of another unit; conduit means for dividing a second stream from said first stream after passage through at least one of the units and introducing said second stream into the concentrating chambers of the unit from which it was withdrawn.

26. Apparatus for separating a solution containing dissolved electrolyte into concentrated and dilute fractions, the apparatus comprising a plurality of concentrating and diluting units each unit comprising spaced electrodes, alternate anion permeable and cation permeable membranes dividing the space between said membranes into alternate concentrating chambers and deionizing chambers, conduit means for passing a first stream of solution through the deionizing chambers of said units; conduit means for dividing a second stream from said first stream after passage through the terminal unit and introducing said second stream into the concentrating chambers of said terminal unit.

27. Apparatus for separating solutions containing dissolved electrolyte into concentrated and dilute fractions comprising, a plurality of concentrating and diluting units each having a set of concentrating chambers and a set of diluting chambers defined between alternate anion permeable and cation permeable membranes and means for passing a direct electric current in series through said membranes and chambers defined between them; conduit means for flowing a first stream of solution for treatment in series through sets of diluting chambers of the several units; conduit means for withdrawing a fraction of said solution after at least partial dilution thereof and passing said fraction through the set of concentrating chambers of the unit from which the dilute fraction was withdrawn; and means for passing an electrolyte through the chambers of the unit not supplied with said fraction.

28. Apparatus for separating solutions containing dissolved electrolyte into concentrated and dilute fractions comprising, a plurality of concentrating and diluting units each having a set of concentrating chambers and a set of diluting chambers defined between alternate anion permeable and cation permeable membranes and means for passing a direct electric current in series through said membranes and chambers defined between them; means for flowing a first stream of solution for treatment in series through the diluting chambers of the several units; means for withdrawing a fraction of said solution after at least partial dilution thereof and passing said fraction through the concentrating chambers of the unit from which it was withdrawn; and means for passing an electrolyte through the concentrating chambers of the last named unit.

29. Apparatus for separating ionic solutions into concentrated and dilute fractions comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for flowing ionic solution through the diluting chambers for treatment therein, said conduit means including means for splitting a flow of solution into a plurality of first branch flows passing through individual diluting chambers, means for combining the branch flows into a common flow after passage through said last named chambers, means for withdrawing second branch flows from said common flow and conducting said second individual branch flows through individual concentrating chambers of the apparatus.

30. Apparatus for separating ionic solutions into concentrated and dilute fractions comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for flowing ionic solution through the chambers for treatment therein, said conduit means including means for splitting a flow of solution into a plurality of first branch flows passing through individual diluting chambers, means for combining the branch flows into a common dilute flow after passage through said last named diluting chambers, means for splitting the common dilute flow into second branch flows, and means for conducting second individual branch flows through individual concentrating chambers.

31. Apparatus for separating ionic solutions into concentrated and dilute fractions comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for flowing ionic solution through diluting chambers, conduit means for flowing liquid through concentrating chambers, and conduit means for passing a portion of the total volume of solution passed through diluting chambers into concentrating chambers.

32. Apparatus for separating ionic solutions into concentrated and dilute fractions comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for passing a volume of ionic solution through diluting chambers and for passing a certain volume of ionic solution first through diluting chambers and subsequently through concentrating chambers, said conduit means including means for collecting the liquid after passage through said last named diluting and concentrating chambers, respectively.

33. Apparatus for separating ionic solutions into concentrated and dilute fractions comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for passing ionic solution through the diluting chambers and for collecting the liquid after passage therethrough, conduit means collecting the liquid after passage through the concentrating chambers, and means for passing ionic solution which first passed through diluting chambers subsequently into concentrating chambers.

34. Apparatus for separating ionic solutions into concentrated and dilute fractions, comprising, a plurality of membranes of two types arranged in alternating sequence, the one type being selectively permeable for ions of one polarity, the other type being permeable to ions of the opposite polarity, said membranes defining two kinds of chambers between them including concentrating chambers and diluting chambers, means for passing a direct electric current through the chambers and membranes, conduit means for passing a first volume of ionic solution through chambers of one kind and collecting the liquid after passage therethrough, conduit means for passing a second volume of ionic solution first through chambers of one kind and then through chambers of the other kind, and collecting the liquid after passage through the last named chambers.

References Cited in the file of this patent

UNITED STATES PATENTS

| | | |
|---|---|---|
| 1,326,104 | Schwerin | Dec. 23, 1919 |
| 2,140,341 | Wallach et al. | Dec. 13, 1938 |
| 2,510,262 | Sollner et al. | June 6, 1950 |
| 2,636,851 | Juda et al. | Apr. 28, 1953 |
| 2,636,852 | Juda et al. | Apr. 28, 1953 |
| 2,860,095 | Katz et al. | Nov. 11, 1958 |

OTHER REFERENCES

"Helvetica Chimica Acta," vol. 23 (1940), pp. 795–800.
"Journal of Phys. and Colloid Chem.," vol. 54 (1950), pp. 204–226.
"Nature," vol. 165 (Apr. 8, 1950), p. 568.
"Journal of The Electrochemical Society," vol. 97, No. 7, pp. 139C–151C.